(12) United States Patent
Thissen et al.

(10) Patent No.: US 12,490,886 B2
(45) Date of Patent: Dec. 9, 2025

(54) STEERABLE INSTRUMENT COMPRISING A DETACHABLE PART

(71) Applicant: Fortimedix Assets II B.V., Geleen (NL)

(72) Inventors: Mattheus Hendrik Louis Thissen, Swalmen (NL); Marcel Antonius Elisabeth Verbeek, Voerendaal (NL)

(73) Assignee: FORTIMEDIX ASSETS II B.V., Geleen (NL)

( * ) Notice: Subject to any disclaimer, the term of this patent is extended or adjusted under 35 U.S.C. 154(b) by 905 days.

(21) Appl. No.: 17/601,734

(22) PCT Filed: Apr. 7, 2020

(86) PCT No.: PCT/NL2020/050239
§ 371 (c)(1),
(2) Date: Oct. 6, 2021

(87) PCT Pub. No.: WO2020/218921
PCT Pub. Date: Oct. 29, 2020

(65) Prior Publication Data
US 2022/0167836 A1    Jun. 2, 2022

(30) Foreign Application Priority Data

Apr. 8, 2019 (NL) ..................................... 2022893
Apr. 8, 2019 (NL) ..................................... 2022896
Oct. 11, 2019 (NL) ..................................... 2023998

(51) Int. Cl.
*A61B 1/00* (2006.01)
*A61B 1/005* (2006.01)
(Continued)

(52) U.S. Cl.
CPC ...... *A61B 1/00147* (2013.01); *A61B 1/00128* (2013.01); *A61B 1/00133* (2013.01);
(Continued)

(58) Field of Classification Search
CPC ............ A61B 1/00066; A61B 1/00128; A61B 1/00133; A61B 1/00147; A61B 1/0051;
(Continued)

(56) References Cited

U.S. PATENT DOCUMENTS 2,515,366 A    7/1950   Zublin
2,717,146 A    9/1955   Zublin
(Continued)

FOREIGN PATENT DOCUMENTS

CH         81017 A      5/1919
CN     101522121 B      9/2011
(Continued)

*Primary Examiner* — Scott Luan
(74) *Attorney, Agent, or Firm* — Fortem IP LLP

(57) ABSTRACT

A steering device for connecting to an elongated instrument comprises a supporting unit comprising a first channel having a first central axis, said first channel extending from a distal side to a proximal side of the supporting unit, wherein the supporting unit is arranged around said first channel, and a steering unit rotationally arranged on said supporting unit, the steering unit arranged to secure/release a plurality of longitudinal elements of an instrument to move with the rotational movement of the steering unit.

23 Claims, 12 Drawing Sheets

(51) Int. Cl.
*A61B 34/00* (2016.01)
*A61B 17/00* (2006.01)

(52) U.S. Cl.
CPC ............ *A61B 1/0052* (2013.01); *A61B 34/71* (2016.02); *A61B 2017/00327* (2013.01); *A61B 2017/00477* (2013.01)

(58) Field of Classification Search
CPC ... A61B 1/0052; A61B 1/0055; A61B 1/0057; A61B 17/00234; A61B 17/2909; A61B 2017/003; A61B 2017/00327; A61B 2017/00477; A61B 2017/291; A61B 2090/0813; A61B 34/30; A61B 34/07
See application file for complete search history.

(56) References Cited

U.S. PATENT DOCUMENTS

| | | |
|---|---|---|
| 3,788,304 A | 1/1974 | Takahashi |
| 4,362,520 A | 12/1982 | Perry |
| 4,706,659 A | 11/1987 | Matthews et al. |
| 4,745,908 A | 5/1988 | Wardle |
| 5,271,381 A | 12/1993 | Ailinger et al. |
| 5,749,828 A | 5/1998 | Solomon et al. |
| 5,807,241 A | 9/1998 | Heimberger |
| 5,928,136 A | 7/1999 | Barry |
| 6,107,004 A | 8/2000 | Donadio |
| 6,450,948 B1 | 9/2002 | Matsuura et al. |
| 6,890,329 B2 | 5/2005 | Carroll et al. |
| 7,189,228 B2 | 3/2007 | Eum et al. |
| 7,320,700 B2 | 1/2008 | Cooper et al. |
| 7,553,275 B2 | 6/2009 | Padget et al. |
| 7,615,067 B2 | 11/2009 | Lee et al. |
| 8,257,267 B2 | 9/2012 | Thornton |
| 8,323,241 B2 | 12/2012 | Salahieh et al. |
| 8,327,518 B2 | 12/2012 | Körner |
| 8,382,742 B2 | 2/2013 | Hermann et al. |
| 8,398,587 B2 | 3/2013 | Dewaele et al. |
| 8,708,954 B2 | 4/2014 | Webler |
| 8,740,884 B2 | 6/2014 | Verbeek |
| 8,845,522 B2 | 9/2014 | Mcintyre et al. |
| 8,882,680 B2 | 11/2014 | Furlong et al. |
| 8,986,317 B2 | 3/2015 | Verbeek |
| 9,072,505 B2 | 7/2015 | Furlong et al. |
| 9,138,566 B2 | 9/2015 | Cabiri |
| 9,198,561 B2 | 12/2015 | Smith et al. |
| 9,220,398 B2 | 12/2015 | Woodley et al. |
| 9,339,271 B2 | 5/2016 | Ranucci et al. |
| 9,421,343 B2 | 8/2016 | Berthiaume et al. |
| 9,462,932 B2 | 10/2016 | Ostrovsky et al. |
| 9,468,359 B2 | 10/2016 | Weisshaupt et al. |
| 9,655,637 B2 | 5/2017 | Mueller |
| 9,848,858 B2 | 12/2017 | Verbeek |
| 9,877,720 B2 | 1/2018 | Worrell et al. |
| 10,010,246 B2 | 7/2018 | Quaye |
| 10,265,087 B2 | 4/2019 | Furlong et al. |
| 10,405,876 B2 | 9/2019 | Boudreaux |
| 10,420,537 B2 | 9/2019 | Salahieh et al. |
| 10,441,746 B2 | 10/2019 | Besselink |
| 10,449,010 B2 | 10/2019 | Dewaele et al. |
| 10,456,556 B2 | 10/2019 | Cabiri |
| 10,485,579 B2 | 11/2019 | Lenker |
| 10,492,771 B2 | 12/2019 | Nunan |
| 10,500,373 B2 | 12/2019 | Barrish et al. |
| 10,524,868 B2 | 1/2020 | Cooper et al. |
| 10,542,878 B2 | 1/2020 | Dewaele et al. |
| 10,561,467 B2 | 2/2020 | Van Der Linde et al. |
| 10,603,047 B2 | 3/2020 | Ding et al. |
| 10,646,104 B1 | 5/2020 | Sinay et al. |
| 10,729,457 B2 | 8/2020 | Lenker et al. |
| 10,792,061 B2 | 10/2020 | Dewaele et al. |
| 10,799,223 B2 | 10/2020 | Furlong et al. |
| 10,874,290 B2 | 12/2020 | Walen et al. |
| 10,962,093 B2 | 3/2021 | Dewaele et al. |
| 11,007,026 B2 | 5/2021 | Kowshik |
| 11,033,255 B2 | 6/2021 | Furlong et al. |
| 11,051,794 B2 | 7/2021 | Cooper et al. |
| 11,052,226 B2 | 7/2021 | Salahieh et al. |
| 11,103,234 B2 | 8/2021 | Felix et al. |
| 11,130,244 B2 | 9/2021 | Jogasaki |
| 11,134,928 B2 | 10/2021 | Felix et al. |
| 11,141,566 B2 | 10/2021 | Cabiri |
| 11,241,557 B2 | 2/2022 | Besselink |
| 11,278,704 B2 | 3/2022 | Pleijers |
| 11,330,964 B2 | 5/2022 | Thissen |
| 11,350,914 B2 | 6/2022 | Furlong et al. |
| 11,382,654 B2 | 7/2022 | Lenker |
| 11,419,691 B2 | 8/2022 | Kim et al. |
| 11,457,904 B2 | 10/2022 | Dewaele et al. |
| 11,523,807 B2 | 12/2022 | Furlong et al. |
| 11,564,670 B2 | 1/2023 | Furlong et al. |
| 11,576,735 B2 | 2/2023 | Blanckaert et al. |
| 11,589,733 B2 | 2/2023 | Sinay et al. |
| 11,607,242 B2 | 3/2023 | Tada et al. |
| 11,642,114 B2 | 5/2023 | Thissen |
| 11,660,101 B2 | 5/2023 | Walen et al. |
| 11,696,677 B2 | 7/2023 | Thissen |
| 11,730,921 B2 | 8/2023 | Besselink |
| 11,730,927 B2 | 8/2023 | Laby et al. |
| 11,839,401 B2 | 12/2023 | Lenker |
| 12,048,819 B2 | 7/2024 | Yang et al. |
| 12,295,550 B2 | 5/2025 | Tilson et al. |
| 2004/0199052 A1 | 10/2004 | Banik et al. |
| 2004/0236316 A1 | 11/2004 | Danitz et al. |
| 2005/0027245 A1 | 2/2005 | Sachdeva et al. |
| 2005/0273084 A1 | 12/2005 | Hinman et al. |
| 2005/0273085 A1 | 12/2005 | Hinman et al. |
| 2006/0199999 A1 | 9/2006 | Ikeda et al. |
| 2006/0281566 A1 | 12/2006 | Lee |
| 2007/0049800 A1 | 3/2007 | Boulais |
| 2007/0250113 A1 | 10/2007 | Hegeman et al. |
| 2007/0282371 A1 | 12/2007 | Lee et al. |
| 2007/0287993 A1 | 12/2007 | Hinman et al. |
| 2008/0249364 A1 | 10/2008 | Körner |
| 2008/0300462 A1 | 12/2008 | Intoccia et al. |
| 2009/0069632 A1 | 3/2009 | McIntyre et al. |
| 2009/0124857 A1 | 5/2009 | Viola |
| 2010/0151161 A1 | 6/2010 | Da |
| 2010/0228191 A1 | 9/2010 | Alvarez et al. |
| 2010/0234831 A1 | 9/2010 | Hinman et al. |
| 2010/0286480 A1 | 11/2010 | Peine et al. |
| 2010/0287755 A1 | 11/2010 | KÖrner |
| 2011/0004157 A1 | 1/2011 | Dewaele et al. |
| 2011/0295065 A1 | 12/2011 | Gurusamy et al. |
| 2012/0116163 A1 | 5/2012 | Lutze et al. |
| 2012/0245414 A1 | 9/2012 | Verbeek |
| 2012/0277730 A1 | 11/2012 | Salahieh et al. |
| 2012/0323077 A1 | 12/2012 | Verbeek |
| 2013/0184528 A1 | 7/2013 | Onuki et al. |
| 2013/0197490 A1 | 8/2013 | Stanton et al. |
| 2013/0253469 A1 | 9/2013 | Freed |
| 2014/0018620 A1 | 1/2014 | Verbeek |
| 2014/0249474 A1 | 9/2014 | Suon et al. |
| 2015/0099997 A1 | 4/2015 | Cabiri |
| 2015/0107396 A1 | 4/2015 | Suehara |
| 2015/0112134 A1 | 4/2015 | Suehara et al. |
| 2015/0157353 A1 | 6/2015 | Lenker et al. |
| 2015/0352728 A1 | 12/2015 | Wang |
| 2015/0366445 A1* | 12/2015 | Rutgers ............... A61B 1/2676 128/200.26 |
| 2016/0015249 A1 | 1/2016 | Suehara |
| 2016/0096004 A1 | 4/2016 | Gerrans et al. |
| 2016/0136393 A1 | 5/2016 | Tsai et al. |
| 2016/0278616 A1 | 9/2016 | Viebach et al. |
| 2017/0027607 A1 | 2/2017 | Verbeek et al. |
| 2018/0049873 A1 | 2/2018 | Manash et al. |
| 2018/0055589 A1 | 3/2018 | Joseph et al. |
| 2018/0289241 A1 | 10/2018 | Zhou et al. |
| 2019/0111237 A1 | 4/2019 | Cabiri |
| 2019/0111238 A1 | 4/2019 | Schultz et al. |
| 2019/0175869 A1 | 6/2019 | Kirt et al. |
| 2020/0275983 A1 | 9/2020 | Dewaele et al. |
| 2020/0330729 A1 | 10/2020 | Petitpierre et al. |
| 2021/0267702 A1 | 9/2021 | Kim et al. |

(56) References Cited

U.S. PATENT DOCUMENTS

| | | |
|---|---|---|
| 2021/0275266 A1 | 9/2021 | Kim et al. |
| 2021/0378648 A1 | 12/2021 | Thissen et al. |
| 2022/0061634 A1 | 3/2022 | Thissen et al. |
| 2022/0087666 A1 | 3/2022 | Sharma et al. |
| 2022/0117576 A1 | 4/2022 | Mixter et al. |
| 2022/0168008 A1 | 6/2022 | Thissen et al. |
| 2022/0331003 A1 | 10/2022 | Cohen et al. |
| 2023/0031313 A1 | 2/2023 | Lynn et al. |
| 2023/0131647 A1 | 4/2023 | Magno et al. |
| 2023/0165573 A1 | 6/2023 | Furlong et al. |
| 2023/0190329 A1 | 6/2023 | Tada et al. |
| 2023/0255644 A1 | 8/2023 | Walen et al. |
| 2024/0138946 A1 | 5/2024 | Swoyer et al. |
| 2024/0173130 A1 | 5/2024 | McNiven et al. |
| 2024/0216008 A1 | 7/2024 | Lenker |
| 2024/0245284 A1 | 7/2024 | Thissen |
| 2024/0306900 A1 | 9/2024 | Thissen et al. |
| 2024/0389835 A1 | 11/2024 | Thissen et al. |
| 2025/0049305 A1 | 2/2025 | Thissen |
| 2025/0049307 A1 | 2/2025 | Thissen |

FOREIGN PATENT DOCUMENTS

| | | |
|---|---|---|
| DE | 3219629 A1 | 12/1983 |
| DE | 4222121 C1 | 9/1993 |
| DE | 102009037030 A1 | 2/2011 |
| DE | 102010000787 A1 | 7/2011 |
| DE | 102010005243 A1 | 7/2011 |
| EP | 0626604 A2 | 11/1994 |
| EP | 3087944 A1 | 11/2016 |
| JP | 2012075659 A | 4/2012 |
| JP | 2015213758 A | 12/2015 |
| KR | 101312071 B1 | 9/2013 |
| NL | 2030160 B1 | 6/2023 |
| WO | 9742910 A1 | 11/1997 |
| WO | 2004103430 A2 | 12/2004 |
| WO | 2006/026520 A2 | 3/2006 |
| WO | 2008139768 A1 | 11/2008 |
| WO | 2009/098244 A2 | 8/2009 |
| WO | 2009/112060 A1 | 9/2009 |
| WO | 2009/127236 A1 | 10/2009 |
| WO | 2010/028090 A2 | 3/2010 |
| WO | 2010/105649 A1 | 9/2010 |
| WO | 2010/136272 A1 | 12/2010 |
| WO | 2010/136274 A1 | 12/2010 |
| WO | 2010/151698 A2 | 12/2010 |
| WO | 2011/018179 A2 | 2/2011 |
| WO | 2011018147 A1 | 2/2011 |
| WO | 2011/079897 A1 | 7/2011 |
| WO | 2012035531 A1 | 3/2012 |
| WO | 2012/128618 A1 | 9/2012 |
| WO | 2012/139869 A2 | 10/2012 |
| WO | 2012/151396 A2 | 11/2012 |
| WO | 2012/173478 A1 | 12/2012 |
| WO | 2013084985 A1 | 6/2013 |
| WO | 2013173197 A1 | 11/2013 |
| WO | 2014/011049 A1 | 1/2014 |
| WO | 2014186736 A1 | 11/2014 |
| WO | 2015051070 A1 | 4/2015 |
| WO | 2015/084174 A1 | 6/2015 |
| WO | 2015/085307 A1 | 6/2015 |
| WO | 2016/030457 A1 | 3/2016 |
| WO | 2016/061291 A1 | 4/2016 |
| WO | 2016054063 A1 | 4/2016 |
| WO | 2016/089202 A1 | 6/2016 |
| WO | 2016/091856 A1 | 6/2016 |
| WO | 2016/091858 A1 | 6/2016 |
| WO | 2016/138443 A2 | 9/2016 |
| WO | 2016/160694 A1 | 10/2016 |
| WO | 2016/172706 A1 | 10/2016 |
| WO | 2017/010883 A2 | 1/2017 |
| WO | 2017/014624 A1 | 1/2017 |
| WO | 2017/082720 A1 | 5/2017 |
| WO | 2017/176766 A1 | 10/2017 |
| WO | 2017/213491 A1 | 12/2017 |
| WO | 2018/067004 A1 | 4/2018 |
| WO | 2018083674 A1 | 5/2018 |
| WO | 2019/009710 A1 | 1/2019 |
| WO | 2019077461 A1 | 4/2019 |
| WO | 2019/096932 A1 | 5/2019 |
| WO | 2019/096939 A1 | 5/2019 |
| WO | 2019/139811 A1 | 7/2019 |
| WO | 2019159142 A1 | 8/2019 |
| WO | 2020/080938 A2 | 4/2020 |
| WO | 2020/102389 A1 | 5/2020 |
| WO | 2020/214027 A2 | 10/2020 |
| WO | 2020/218920 A2 | 10/2020 |
| WO | 2020218921 A3 | 10/2020 |
| WO | 2021/146677 A1 | 7/2021 |
| WO | 2024033706 A1 | 2/2024 |
| WO | 2025026670 A1 | 2/2025 |
| WO | 2025026702 A1 | 2/2025 |

\* cited by examiner

STEERABLE INSTRUMENT COMPRISING A DETACHABLE PART

FIELD OF THE INVENTION

The present invention relates to a steerable instrument for invasive and non-invasive type of applications, such as in surgery. Such instruments can be used in, for instance, the field of gastroscopy, colonoscopy, endoscopy, laparoscopy, and other medical applications. However, the steerable instrument according to the invention can also be used in non-medical applications. Examples of the latter include inspection and/or repair of mechanical and/or electronic hardware at locations that are difficult to reach.

BACKGROUND ART

Transformation of surgical interventions that require large incisions for exposing a target area into minimal invasive surgical interventions, i.e. requiring only natural orifices or small incisions for establishing access to the target area, is a well-known and ongoing process. In performing minimal invasive surgical interventions, an operator such as a physician, requires an access device that is arranged for introducing and guiding invasive instruments into the human or animal body via an access port of that body. In order to reduce scar tissue formation and pain to a human or animal patient, the access port is preferably provided by a single small incision in the skin and underlying tissue. In that respect the possibility to use a natural orifice of the body would even be better. The access device preferably enables the operator to control one or more degrees of freedom that the invasive instruments offer. In this way, the operator can perform required actions at the target area in the human or animal body in an ergonomic and accurate manner.

Steerable surgical invasive instruments in the field of gastroscopy, colonoscopy, endoscopy, laparoscopy, etc. are well-known in the art. The invasive instruments can comprise a steerable tube shaped device that enhances its navigation and steering capabilities. Such a steerable tube shaped device may comprise a proximal end part, a distal end part including at least one deflectable zone, and a rigid or flexible intermediate part or shaft, wherein the steerable tube shaped device, at its proximal end, further comprises a steering arrangement that is adapted to deflect the distal deflectable zone relative to a central axis of the tube shaped device.

Most of the known instruments are complex to manufacture resulting in expensive instruments. Often, the distal end of the instruments comprise a flexible zone that is composed of separate links with hinging pins, coils or flexible plastic extrusions. Steering cables should be guided through holes through these links and/or through guiding eyes or hooks.

In many prior art devices, the steering arrangement comprises conventional steering cables with, for instance, sub 1 mm diameters as control members, wherein the steering cables are arranged between related deflectable zones at the distal end part and the steering arrangements at the proximal end part of the tube shaped device. Alternatively, control members may be implemented by one or more sets of longitudinal elements that are, e.g., formed by laser cutting in tube elements. Further details regarding the design and fabrication of the abovementioned steerable tube and the steering arrangement thereof have been described for example in WO 2009/112060 A1, WO 2009/127236 A1, WO 2017/213491 A1, and WO 2018/067004. Such instruments can advantageously be used in endoscopic operations where the length need not be more than say 1 meter.

Sometimes a plastic extruded tube can be used with integrated channels for accommodating the cables. This renders an instrument with a simple construction. However, most plastics are rather weak. In case of very long instruments, e.g. longer than 1 meter, therefore, problems may arise due to the high forces exerted on the cables, both the steering cables and the actuation cable arranged to operate the tool at the distal end of the instrument. Problems may be undesired cuts, slip stick effects in the plastic tube and often a too high friction on the cables causing steering by the steering cables to be difficult and hard to manage. Moreover, mechanical properties of many plastics may be too poor to guarantee a high enough torsion stiffness which is required because the instruments should be capable of being rotated in use where they may have been guided through several curves impeding rotation of the whole instrument. Another disadvantage of a plastic tube may be that in case it is provided with an actuation cable to operate a tool at the distal end of the instrument the force in the actuation cable can increase to an extent that it exceeds the maximum longitudinal force allowed in the extruded plastic tube. If so, it would be impossible to operate the tool with an acceptable force. Moreover, if the plastic tube is in a curved arrangement and high force is exerted on the actuation cable, the channels for the steering cables may be deformed, especially in bent/deflected portions, such that the steering cables are clamped and cannot move freely anymore in the channels, thus, impeding proper operation of the steering of the distal deflectable zones.

In medical applications where longer instruments are necessary, such as in colonoscopy where 1.5 meter long instruments (or longer) may be applied, requirements as to steerability, flexibility, stiffness and accuracy increase seriously. There is a desire to develop such instruments with a better performance than prior art devices as to steerability also under end-effector actuation, longitudinal stiffness, torsion stiffness, durability and applicability of a mechanically actuated tool at the distal end.

In medical applications, contamination of an instrument after it has been used to perform a surgical procedure on a patient can be a problem resulting in undesired post-operative complications. The contamination may be due to blood, other body fluids, tissue, etc. As a consequence of the contamination, the instrument may contain germs, viruses or other biological or chemical substances that could threat the health of the next patient on which the instrument is used.

One way of avoiding this contamination requires performing a thorough cleaning and sterilization of the instrument before each use. In many cases, the cleaning process is not capable of removing all contamination, and/or is very expensive. Therefore, a risk of adverse effects on a patient that is treated with such an instrument still exists. In order to prevent the risk of contamination, there is a preference for using disposable instruments which are used a single time and are thrown away after treating one patient.

SUMMARY

According to a first aspect of the invention, a steering device for connecting to an elongated instrument comprises a supporting unit comprising a first channel having a first central axis, said first channel extending from a distal side to a proximal side of the supporting unit, wherein the supporting unit is arranged around said first channel, and a steering unit rotationally arranged on said supporting unit, the steering unit arranged to secure/release a plurality of longitudinal elements of an instrument to move with the rotational movement of the steering unit.

Such a steering device can allow for easy coupling and decoupling of an instrument for medical or other operations. The elongated instrument can use the longitudinal elements for steering purposes, allowing for bending and movement at a distal end controlled by the steering unit. By having a steering unit to which the longitudinal elements secure, the longitudinal elements can be push or pull for proper steering, and this allows for easy connection and disconnection of the instrument from the steering device. This allows for the instrument to be quickly, securely and easily coupled to a steering device when needed, by even non-technical persons. With this simple connection, the instrument could be disposable while more complicated steering device and steering unit parts are reusable.

According to an embodiment, the supporting unit comprises a ball shaped element such that the steering unit can rotate around the ball shaped element and the first channel extends through the ball shaped element. Such a ball-shaped element can allow for the movement steering unit needs with respect to the instrument shaft while preventing any movements which could cause twisting or tangling of the longitudinal steering elements.

According to an embodiment, the steering unit comprises a steering plate and one or more frames connected around one or more axes to enable movement of the steering plate in space. By enabling any movement of steering plate, the movement of the instrument can be more precisely controlled.

According to an embodiment, the steering unit comprises a second channel and the ball shaped element is arranged in said second channel, thereby allowing the steering device to control the movement of instrument very precisely.

According to an embodiment, the steering unit comprises a plurality of connectors for connecting the plurality of longitudinal elements to the steering unit, thereby enabling pushing and pulling movements by the steering device for controlling the movement of instrument very precisely. The plurality of connectors may comprise a plurality of openings in the steering unit configured to receive one longitudinal element wherein the plurality of openings may be any suitable number and have any suitable shape. The plurality of connectors may comprise a plurality of grooves extending inward from the circumference of the steering unit. This allows for easy attaching and detaching of the longitudinal elements to the steering device.

According to an embodiment, the plurality of connectors may comprise a plurality of arm-shaped elements extending outwardly from the steering member unit. The arm-shaped elements can be easily connected to and disconnected from the instrument by, for instance, providing an end part or any other suitable part of the arm-shaped element that can be introduced in and extracted from the longitudinal elements of the instrument.

According to an embodiment, the steering device further comprises a locking mechanism for securing the longitudinal elements to the steering unit. This allows for avoiding that the longitudinal elements can be released accidentally during use by locking the locking mechanism, and easily release the instrument from the steering unit by opening the locking mechanism.

According to an embodiment, the locking mechanism comprises a locking plate configured to secure the plurality of longitudinal elements to the steering unit, wherein the plurality of longitudinal elements are secured to the steering unit through a plurality of openings and the locking plate connects to the steering unit such that the locking plate prevents the plurality of longitudinal elements from exiting the plurality of openings. Furthermore, the locking plate may be movable from an open position where the longitudinal elements can be inserted or removed from the openings to a locked position where the longitudinal elements are secured within the openings. These are advantageous ways of allowing to attach and detach the instrument and the steering device.

The locking plate may be moveable axially to secure longitudinal elements in openings extending inward from the circumference of the steering unit. Furthermore, the locking plate is rotationally moveable to move from the open position to the locked position.

In another embodiment, the locking plate comprises a plurality of protruding elements extending around the outer circumference of the locking plate, wherein each of the plurality of protruding elements comprises a hook-shaped side arranged to receive a longitudinal element in a channel to secure the longitudinal element. In this way, the longitudinal elements can be easily secured by rotating the locking device in the right direction. Instead of a hook-shaped side, the protruding elements may have any other shape that allows the longitudinal elements to be secured in the channel. The protruding elements may comprise an inclined side arranged opposite to the channel such that when the locking plate rotates from the locked position with the longitudinal elements secured in the channels to the open position, the longitudinal elements slide on the inclined side of the protruding elements and are thereby pushed out from the plurality of openings. This provides a very simple and advantageous way of releasing the instrument form the steering device. The steering device may be arranged such that, when the plurality of elongated elements are secured to the steering unit, rotational movement of the steering unit around the supporting unit will cause the steering unit to push and/or pull the plurality of elongated elements According to an embodiment of the invention, an elongated instrument for connecting to a steering device comprises an elongated shaft with a distal end and a proximal end, and a plurality of elongated elements extending along the shaft, wherein each of the plurality of elongated elements comprises at the proximal end a connecting part for securing the elongated instrument to the steering device.

According to an embodiment of the invention, the plurality of longitudinal elements are arranged extending outwardly from the elongated shaft. This provides an advantage for easily connecting the instrument from a steering device because the longitudinal elements are already arranged at the correct attaching position. Furthermore, the longitudinal instrument may comprise a cone-shaped device at the proximal end arranged to push away the longitudinal elements for extending outwardly from the elongated shaft. This allows the longitudinal elements to stay in the correct attaching position.

According to an embodiment of the invention, the connecting parts of the elongated instrument may comprise an opening. This allows for easy connection and disconnection of the instrument and the steering device because arm-shaped elements or any other suitable shaped element of the steering device can be inserting into or extracting from the openings of the longitudinal elements.

The elongated instrument comprises a tube and wherein the plurality of longitudinal elements are made by either laser or water cutting a plurality of longitudinal slots in the tube.

Embodiments of the invention are claimed in dependent claims.

Further features and advantages of the invention will become apparent from the description of the invention by way of non-limiting and non-exclusive embodiments. These embodiments are not to be construed as limiting the scope of protection. The person skilled in the art will realize that other alternatives and equivalent embodiments of the invention can be conceived and reduced to practice without departing from the scope of the present invention. Moreover, separate features of different embodiments can be combined, even if not explicitly shown in the drawings or explained in the specification, unless such combination is physically impossible. The scope of the present invention is only limited by the claims and their technical equivalents.

BRIEF DESCRIPTION OF THE DRAWINGS

The present invention will be discussed in more detail below, with reference to the attached drawings, in which like or same reference symbols denote like, same or corresponding parts, and in which.

DESCRIPTION OF EMBODIMENTS

Same reference number will be used in different figures for indicating the same element.

Figure 1:
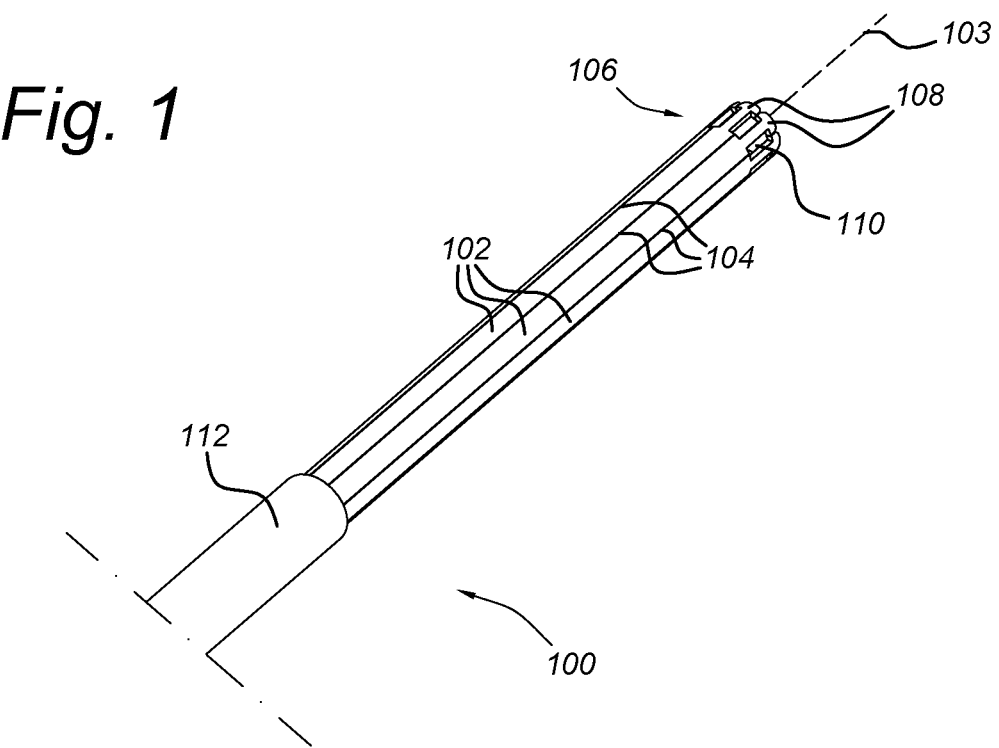
FIG. 1 shows an instrument according to one embodiment of the invention.

FIG. 1 shows a non limiting embodiment of an instrument 100 comprising a plurality of longitudinal elements 102 arranged around a central axis 103 of the instrument 100. Instrument 100 is shown schematically to represent any steerable instrument for use in medical or other operations. Suitable instrument arrangements can be found in NL2021823, titled Steerable instrument comprising a tube element, Filed on Oct. 16, 2018 and hereby incorporated by reference. The longitudinal elements 102 shown in FIG. 1 are implemented by longitudinal strip shaped elements in tube elements and separated by longitudinal slots 104 resulting from laser cutting in the cylindrical tube, as explained in detail in, for example, WO 2009/112060 A1, WO 2009/127236 A1, WO 2017/213491 A1, and WO 2018/067004, or by rigid cables or wires.

These longitudinal slots 104 extend through the whole thickness of the material. As an alternative to laser cutting other techniques may be used, e.g., cutting by means of water jets. Also, other methods such as 3D laser printing may be used. These slots extend through the whole thickness of the material. This also holds for other embodiments discussed below where reference is made to laser cutting.

The longitudinal elements 102 comprise at a proximal end 106 of the instrument 100 a T-shaped connecting part 108 which may be implemented by laser cutting a rectangular slot 110 at the proximal end 106 of each longitudinal slot 104. The instrument 100 shown in FIG. 1 may comprise further at least a distal deflectable zone at a distal end of the instrument 100 (not shown in FIG. 1) wherein the longitudinal elements 102 are connected to the distal deflectable zone (not shown in FIG. 1) such that by pulling or pushing the longitudinal elements 102 the distal deflectable zone is controlled to deflect in a desired direction. A tool (not shown in FIG. 1), like a forceps or any other kind of suitable tool, may be arranged at said distal end of the instrument 100. The instrument 100 shown in FIG. 1 may also comprise an outer tube 112 covering partially or completely the longitudinal elements 102. Furthermore, the instrument 100 may comprise as well a shaft (not shown in FIG. 1) arranged inside the shaft 112 such that the longitudinal elements 102 are arranged surrounding said shaft 112.

Figure 2:
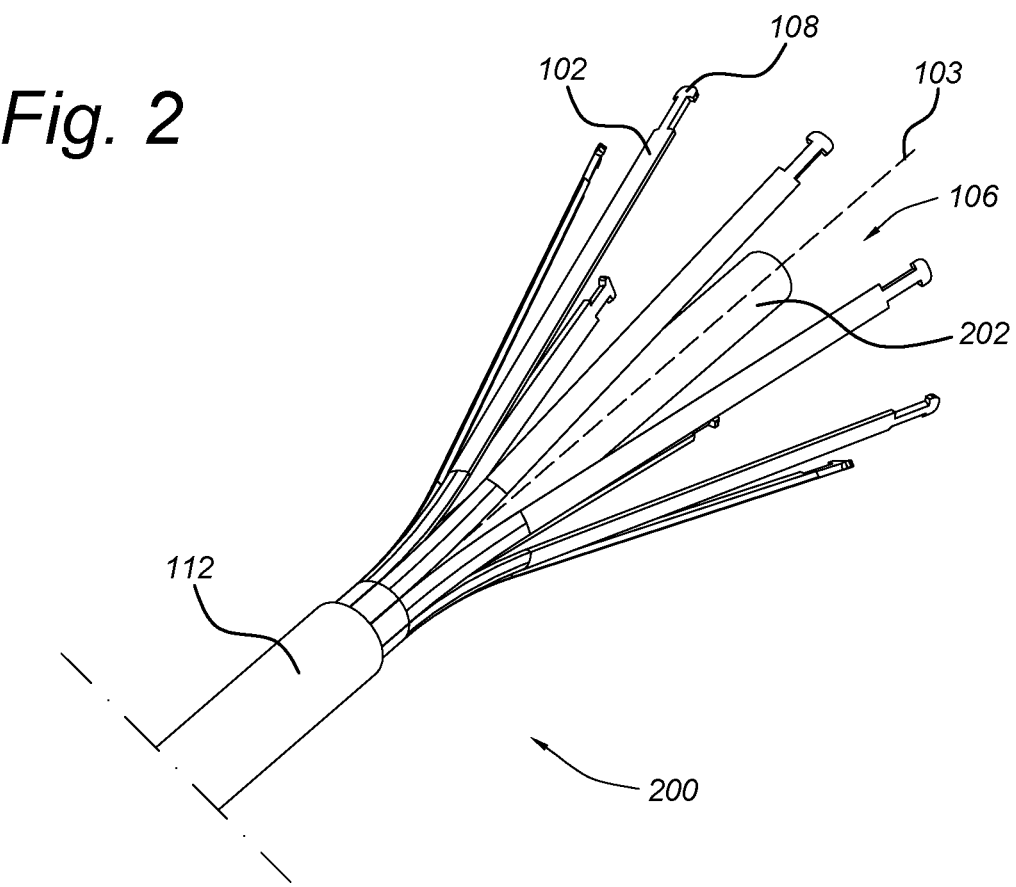
FIG. 2 shows the instrument of FIG. 1 with the longitudinal elements arranged extending outwardly.

FIG. 2 shows a non limiting embodiment of the instrument shown in FIG. 1 wherein the longitudinal elements 102 are arranged to extend outwardly from the shaft 202 at the proximal end 106 of the instrument 200. The longitudinal elements 102 may be arranged to extend outwardly by manually bending or by any other suitable means.

Figure 3:
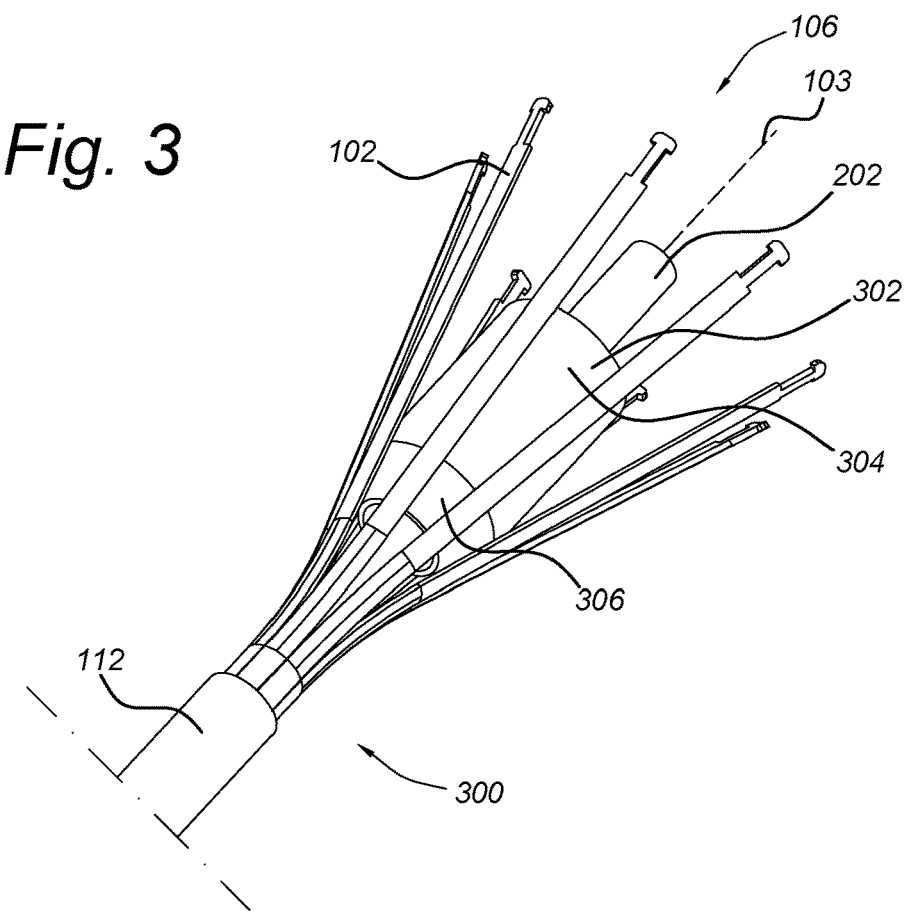
FIGS. 3 and 4 show alternative structures for the embodiment of FIG. 2.

FIG. 3 shows an alternative non limiting embodiment of the instrument shown in FIG. 2 wherein the instrument 300 comprises a device 302 arranged around the shaft 202 wherein the device 302 comprises a proximal end 304 and a distal end 306 wherein the proximal end 304 comprises a cylindrical shape and the distal end 306 comprises a conical shape such that the conical shape is arranged to push the longitudinal elements 102 outwardly from the shaft 202.

Figure 4:
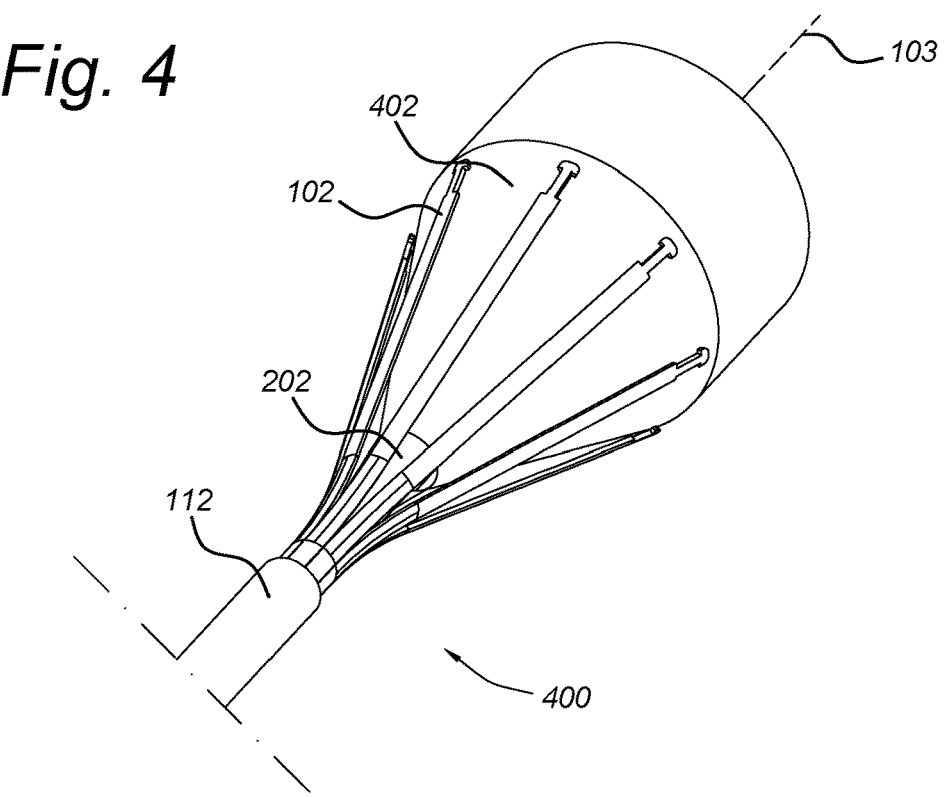

FIG. 4 shows an alternative example method of expanding the longitudinal elements of the instrument shown in FIG. 2. Longitudinal elements 102 are arranged extending outwardly from the central axis 103 of the instrument 400 by a cone-shaped device 402 wherein the cone-shaped device 402 is arranged surrounding the shaft 202 such that the longitudinal elements 102 are expanded by the outer surface of the cone-shaped device 402.

It should be understood that any other suitable device or method can be used to arrange the longitudinal elements at the proximal end such that the longitudinal elements extend outwardly from the central axis of the instrument.

Figure 5:
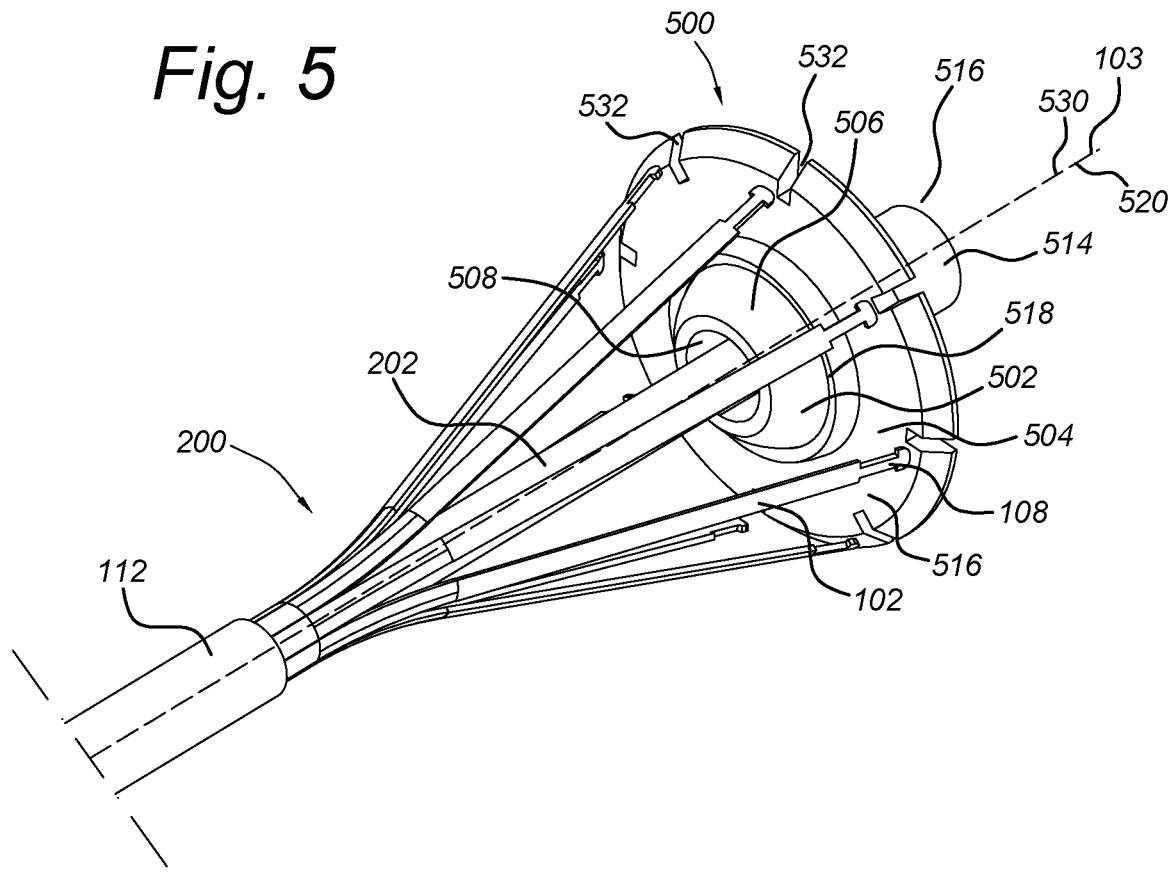
FIG. 5 shows an instrument and a steering device according to one embodiment of the invention

FIG. 5 shows a steering device 500 according to one embodiment with an instrument being connected.

The steering device 500 comprises a supporting unit 502 and a steering unit 504. The supporting unit 502 comprises a ball-shaped element 506 traversed by a first channel 508 wherein the first channel 508 has a circular shape and extends from a proximal end 510 of the steering device 500 to a distal end 512 of the steering device 500. The first channel 508 extends from the ball-shaped element 506 at the proximal end of the steering device 500 thereby defining a hollow tube 514 which extends outwardly from the ball-shaped element.

The steering unit 504 comprises a steering plate 516 and a second channel 518 located at the centre of the steering plate 516 wherein the second channel 518 comprises a circular shape.

The supporting unit 502 is arranged in the second channel 518 such that the steering unit 504 can rotate around the ball-shaped element 506 and such that the central axis 520 of the first channel 508 coincides with the central axis 530 of the second channel.

The steering plate 516 comprises further a plurality of grooves 532 extending inward from the circumference of the steering unit of the steering plate 516 wherein the grooves 532 have a U-shape, though could take a number of different shapes in different embodiments.

The steering device 500 is arranged to be attached to the instrument 200 in the following way. Each elongated element include a connecting part 509 which can fit into groove 532 and secure in groove 532. In this case, a T-shaped connection is formed with a narrower portion to go within the groove and a wider portion at the end to ensure no longitudinal movement of elongated elements is allowed once connected. The inner shaft 406 of the instrument is introduced into the side of the first channel 504 of the supporting member 502 located at the distal end of the steering device 500 such that the central axis 409 of the instrument coincides with the central axis 520 of the first channel 508 and such that the connecting part 509 of the longitudinal elements 408 align with the grooves 532. The connecting part 509 of the longitudinal elements 408 is then pushed into the grooves such that the upper wider part of the T shape is secured at a proximal side of the steering plate, as shown in FIG. 6.

Figure 6:
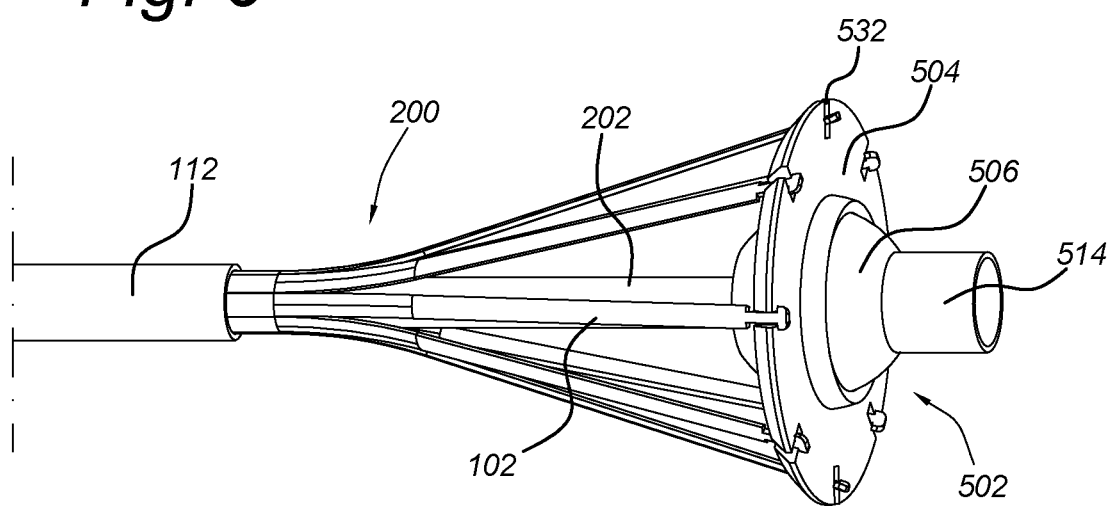
FIG. 6 shows the instrument and the steering device of FIG. 5 coupled to each other.

As it can be seen in FIG. 6, by moving the steering plate 516 around the ball-shaped element 506, the longitudinal elements 408 are pushed or pulled by the steering plate 516 thereby causing distal deflection (not shown in FIG. 6).

Figure 7:
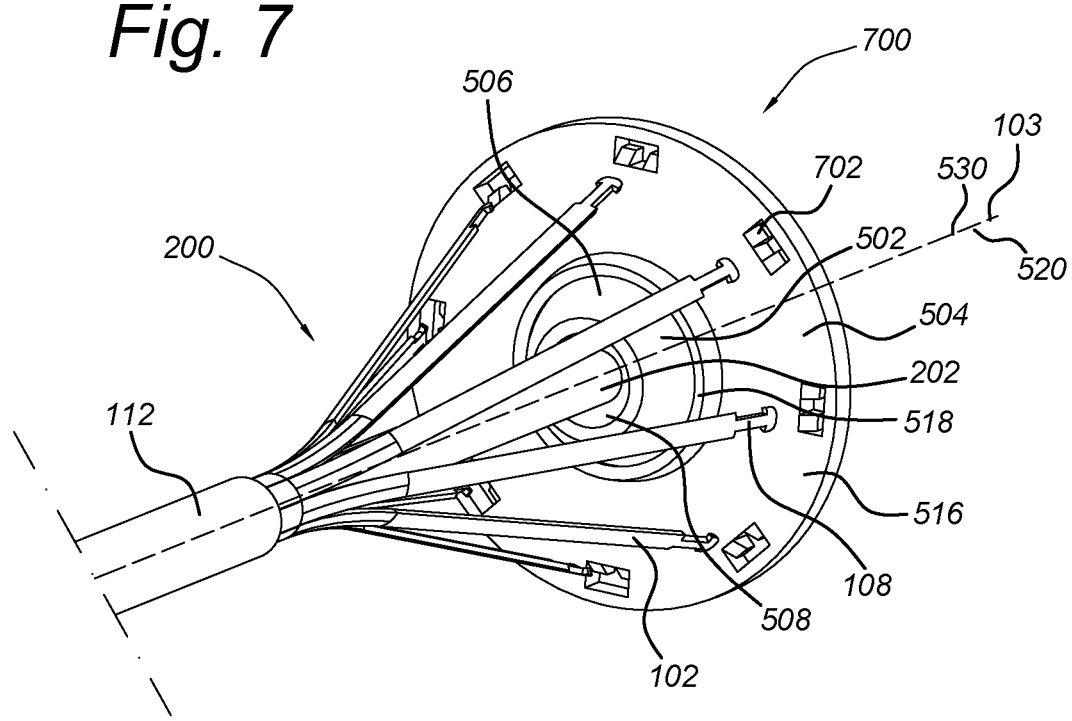
FIG. 7 shows an alternative structure for the steering device of FIG. 5.

FIG. 7 shows an alternative embodiment of the steering device 500 of FIG. 5 wherein the steering plate 516 comprises a plurality of openings 702 instead of circumferential grooves. The way of attaching the instrument to the steering device 700 is similar to that explained with reference to FIG. 5 but in this embodiment the connecting parts 108 of the longitudinal elements are pushed against the openings, such that they "click" into a receiving portion of the steering plate 516. As can be seen in this embodiment, the connecting portions click into a complementary shaped receiving portion in the steering plate 516, with a central opening and a ramp to guide the catching feature (here, the wider "top" of the connecting portion 509) to a securing position.

Figure 8A:
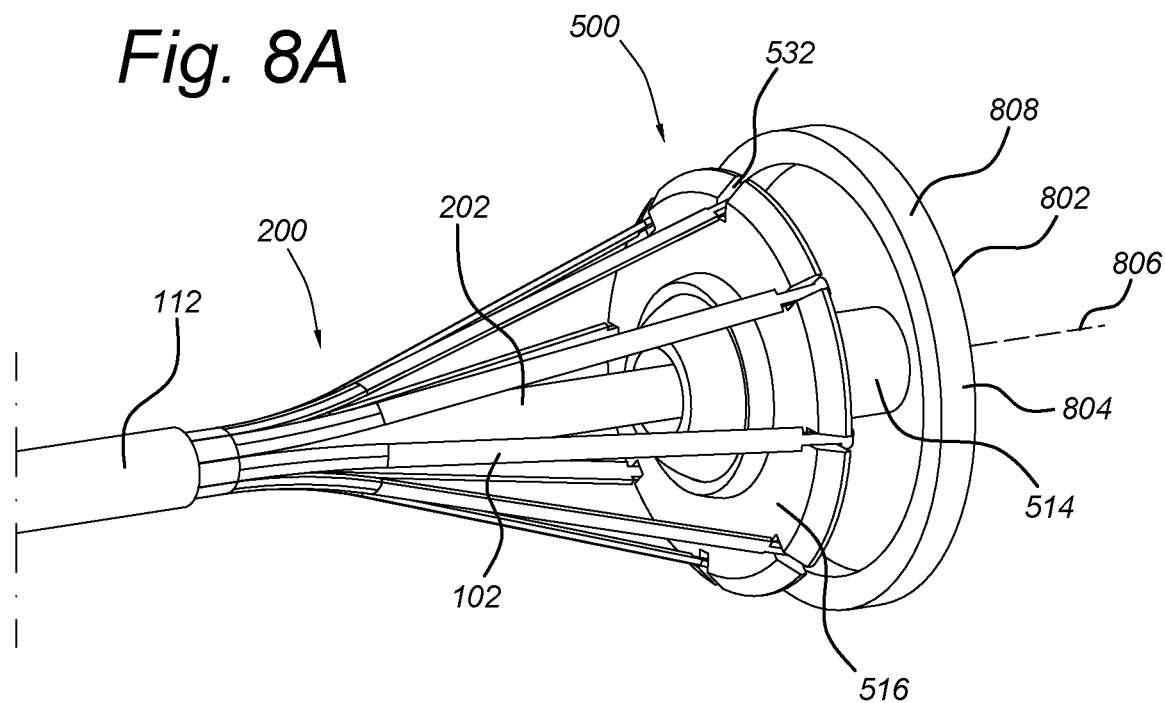
FIGS. 8A and 8B show the instrument and the steering device of FIG. 6 further comprising a locking mechanism.
Figure 8B:
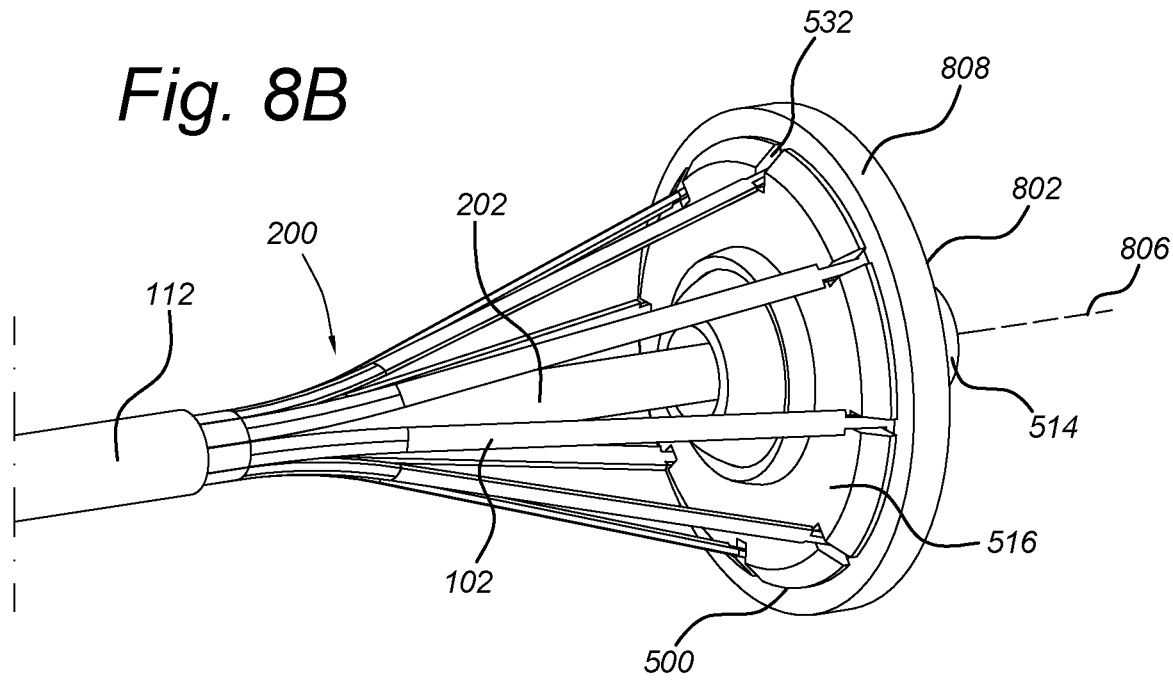

FIGS. 8A and 8B shows the embodiment of FIG. 6 further comprising a locking mechanism in the form of locking plate 804.

The locking mechanism 802 shown in FIGS. 8A and 8B is movable between an open position (shown in FIG. 8A) and a closed position (shown in FIG. 8B).

As it can be seen in FIG. 8A, the steering device 500 and the instrument 200 are coupled to each other such that the elongated elements 102 are placed in the grooves 532 as it has been explained with reference to FIG. 5. FIG. 8A also shows a locking mechanism 802 for securing the longitudinal elements 102 to the steering unit 504 wherein the locking mechanism 802 is in an open position such that the longitudinal elements 102 can be inserted into or removed from the grooves 532. The locking mechanism 802 comprises a locking plate 804 having a circular shape with an opening in the centre such that the tube 514 of the supporting unit 502 can pass through the opening. The locking plate 804 is movable axially from an open position where the longitudinal elements are removed from the grooves to a locked position wherein the longitudinal elements are secured within the grooves, e.g, the locking plate 804 can be moved towards or away the steering device 500 along the central axis 806 and/or could be moved in a rotational manner.

FIG. 8B shows the embodiment of FIG. 8A wherein the locking mechanism has been moved from the open position shown in FIG. 8A to the locked position of FIG. 8B by moving the locking plate axially towards the steering device. This movement is until the locking plate 804 clicks against the steering plate 516 and/or connecting parts 509 of the longitudinal elements thereby preventing the longitudinal elements from being removed from the grooves 532 or openings 702. Locking mechanism and/or plate 804 can be in a number of different shapes as long as it can quickly and securely couple to steering plate 516 to ensure that longitudinal elements are secured to steering plate 516.

Figure 9A:
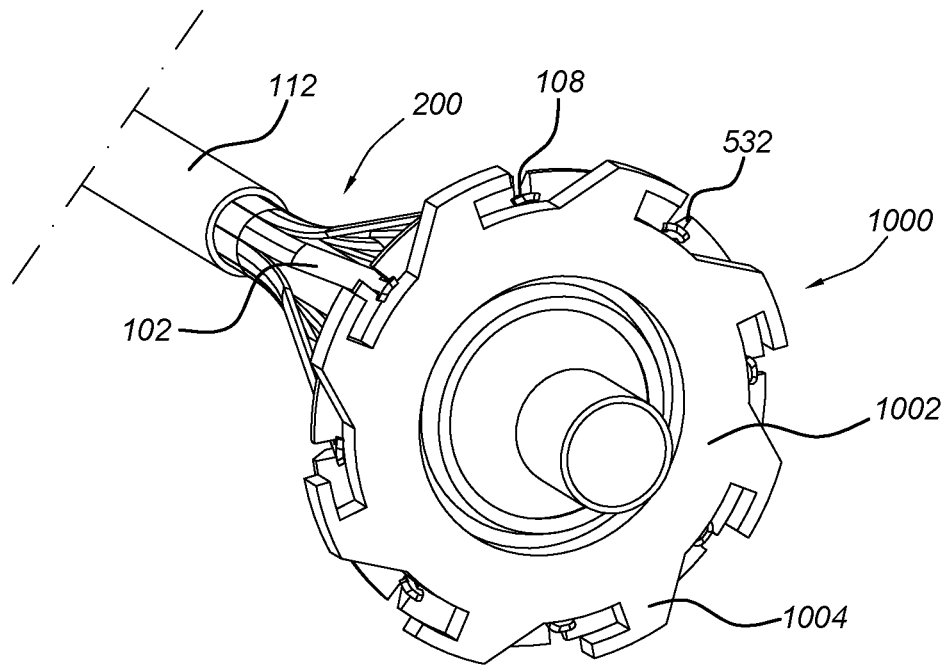
FIGS. 9A, 9B and 9C show an alternative structure of the locking mechanism of FIG. 8 in three different positions.
Figure 9B:
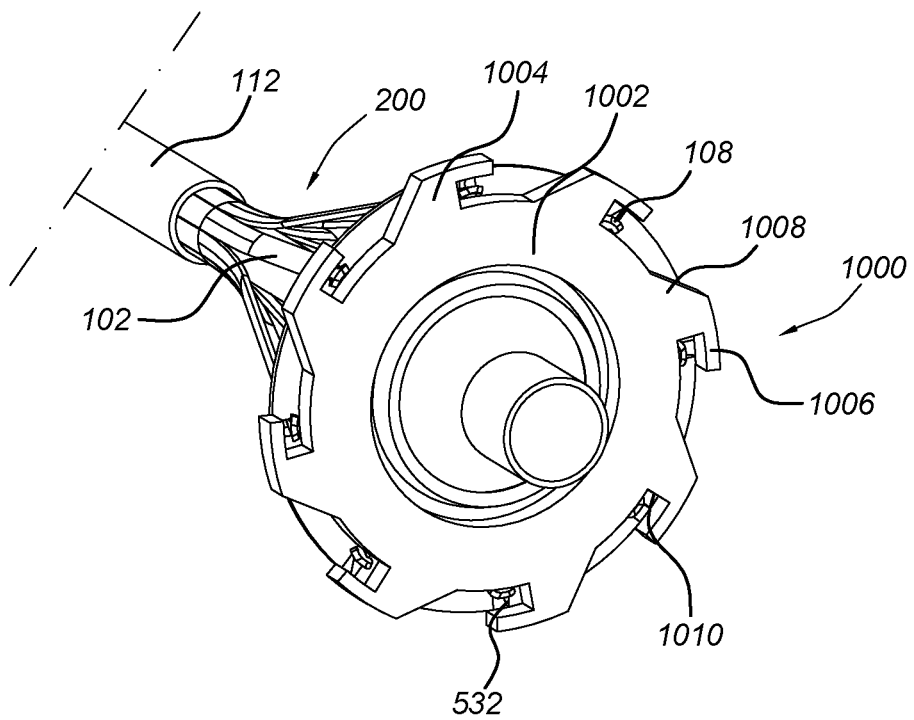
Figure 9C:
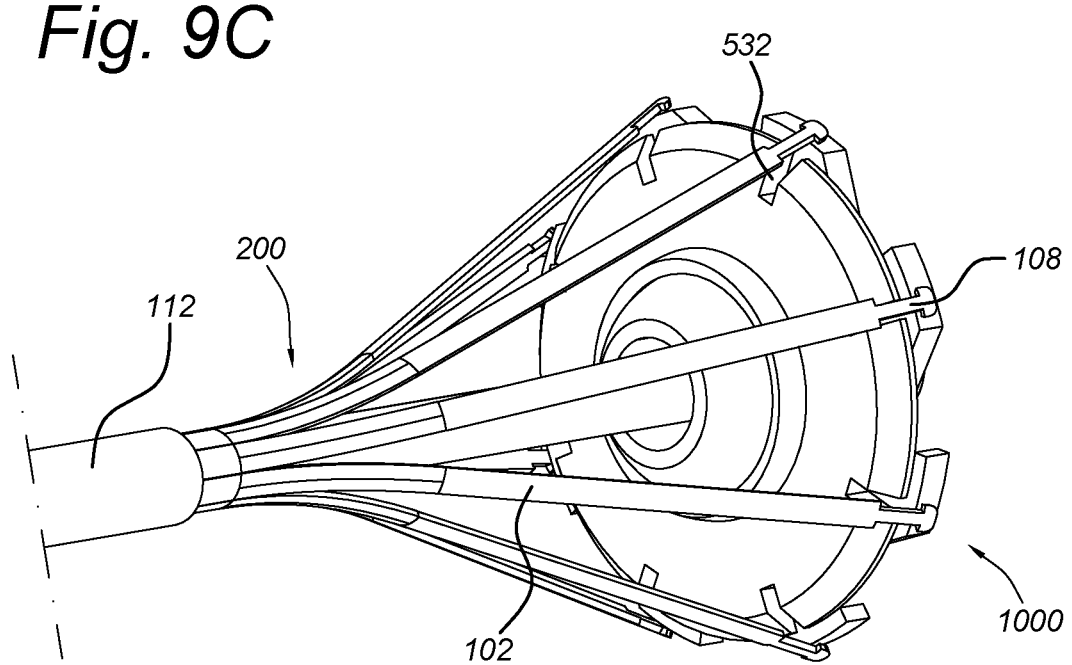

FIGS. 9A, 9B and 9C show an alternative structure for the locking mechanism of FIG. 8.

The locking mechanism 1000 shown in FIGS. 9A, 9B and 9C comprise a locking plate 1002. The locking plate 1002 comprises an opening arranged such that the locking plate 1002 can be rotationally mounted with respect to steering plate 516. The locking plate 1002 comprises a plurality of protruding elements 1004 extending around an outer circumference of the locking plate. Each of the protruding elements 1004 comprises a hook-shaped side 1006 which forms a channel and an inclined side 1008.

FIG. 9A shows the locking mechanism 1000 in a position wherein each longitudinal element 102 is located between the hooked-shape side 1006 of a protruding element and the inclined side of the neighboring protruding element such that the longitudinal elements 102 can be removed from the grooves 532 of steering plate 516.

The locking plate 1002 is configured to be axially clockwise rotated from the open position shown in FIG. 9A to the locked position shown in FIG. 9B. The locking plate 1002 shown in FIG. 9A is axially clockwise rotated such that the hooked-shape side of each of the protruding elements moves towards the corresponding elongated element 102 until the elongated element is inside of a channel 1010 defined by the hooked-shape side thereby reaching the locked position shown in FIG. 9B wherein the longitudinal elements 102 are secured in the channels 1010.

FIG. 9C shows the locking device shown in FIG. 9B after being axially clockwise rotated from the locked position to a detached position wherein the longitudinal elements have been removed from the grooves. By axially rotting the locking plate counter-clockwise, the inclined side of each of the protruding elements moves towards the corresponding longitudinal element 102 such that the longitudinal element slides on the inclined side and is pushed out from its corresponding groove by the inclined side 1008, thereby reaching the detached position shown in FIG. 9C wherein the longitudinal elements 102 are out of the grooves.

Figure 10A:
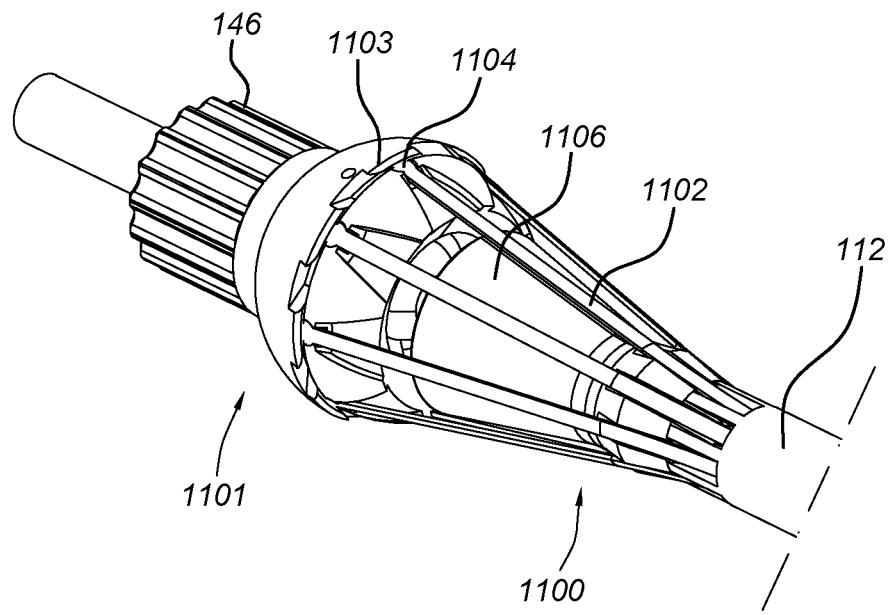
FIGS. 10A-10B shows an embodiment of a steering device with an instrument being coupled to the steering device.
Figure 10B:
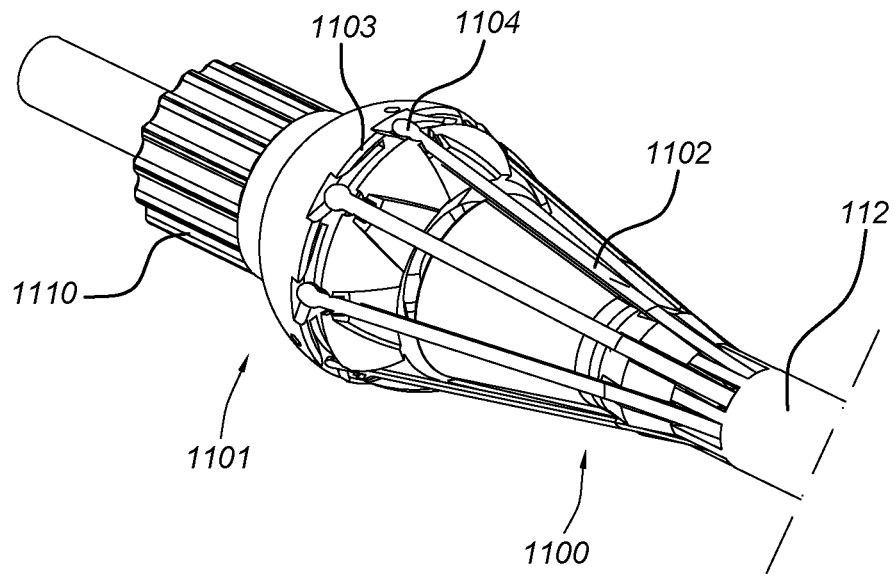
Figure 10C:
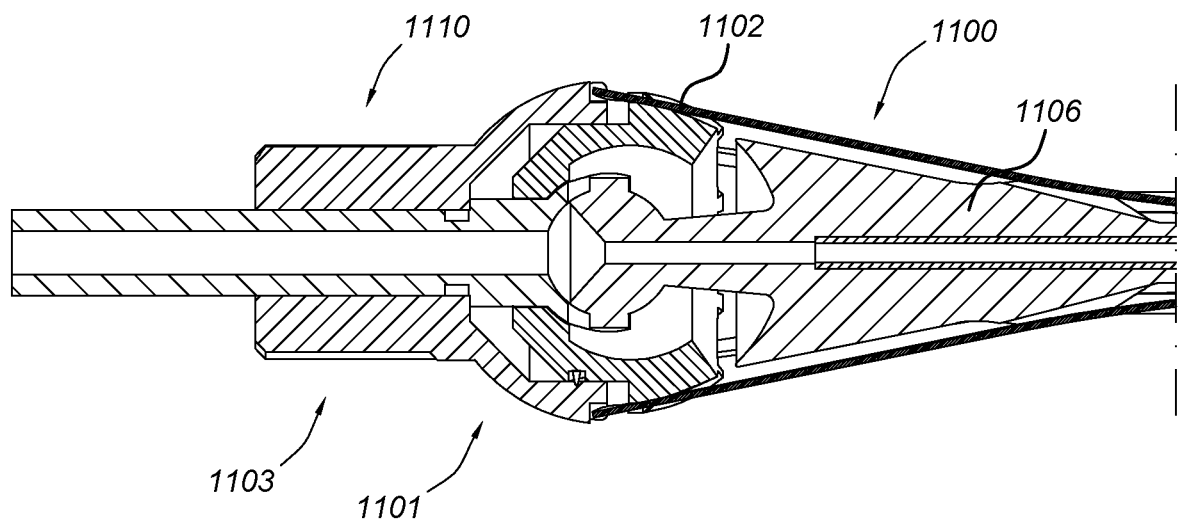
FIGS. 10C-10D show cross-sectional views of the coupling shown in FIGS. 10A-10B.
Figure 10D:
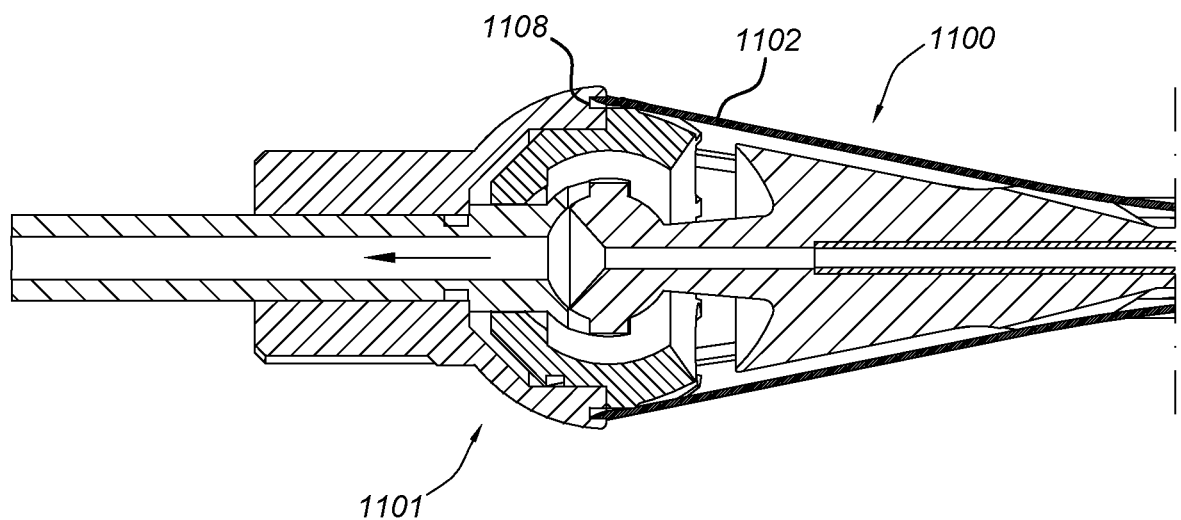

FIGS. 10A-10D shown another embodiment according to the invention comprising an instrument 1100, a steering device 1101 and a locking mechanism 1103. FIGS. 10A and 10B show the instrument and the steering device coupled together wherein the locking mechanism is in an open position in FIG. 10A and in a closed position in FIG. 10B. FIGS. 10C and 10D shown cross-sectional views of the instrument 1100 and steering device being coupled together.

FIGS. 10A-10D show an instrument 1100 like the instrument in FIG. 1 wherein the connecting parts 1104 of the longitudinal elements 1102 have a circular shape instead of a T-shape.

The locking mechanism 1103 shown in FIGS. 10A-10D comprises a semi spherical shape with a locking portion which operates similar to locking plate 1002 shown in FIGS. 9A-9C. Locking mechanism 1103 includes slots for receiving connecting portions 1104 or longitudinal elements 1102. Longitudinal elements 1102 can be slide into place by following the curvature of conical section 1106 leading to receiving grooves 1108. As can be seen in FIG. 10C, conical section 1106 is moved closer to locking mechanism 1103 when in an open position. This allows for easier insertion (and removal of elongated elements) into grooves 1108. When elongated elements 1102 are secured in grooves, locking mechanism 1103 is rotated to secure elongated elements in place in grooves. This is shown in FIGS. 10A and 10D. Such rotational movement to a locked position also extends conical section 1106 axially with respect to locking mechanism 1103. This ensures proper tensioning of elongated elements, to ensure proper bending and deflection of the instrument. The instrument can be easily removed in the same steps, rotation of locking mechanism 1103, followed by pulling instrument axially away from steering device 1101. When locking mechanism 1103 is rotated to the open position, as seen in FIG. 10B, elongated elements 1102 are pushed from grooves 1108 for easy detachment of instrument from steering device. Rotation could be performed manually, for example, through use of gripping portion, or could be automated.

Figure 11A:
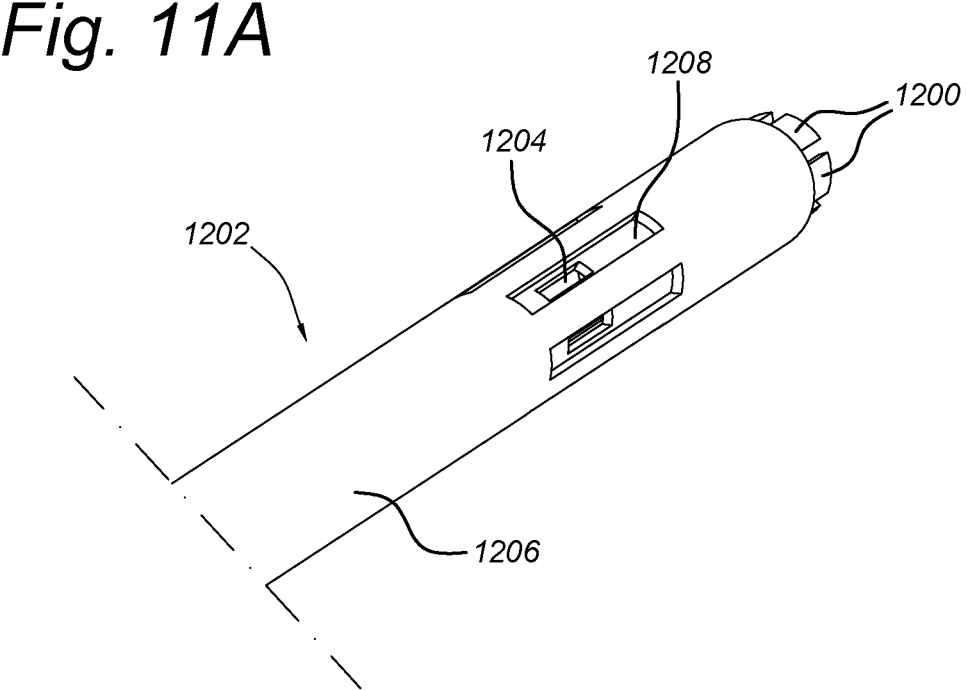
FIGS. 11A-11C another embodiment of a steering device with an instrument being coupled to the steering device.
Figure 11B:
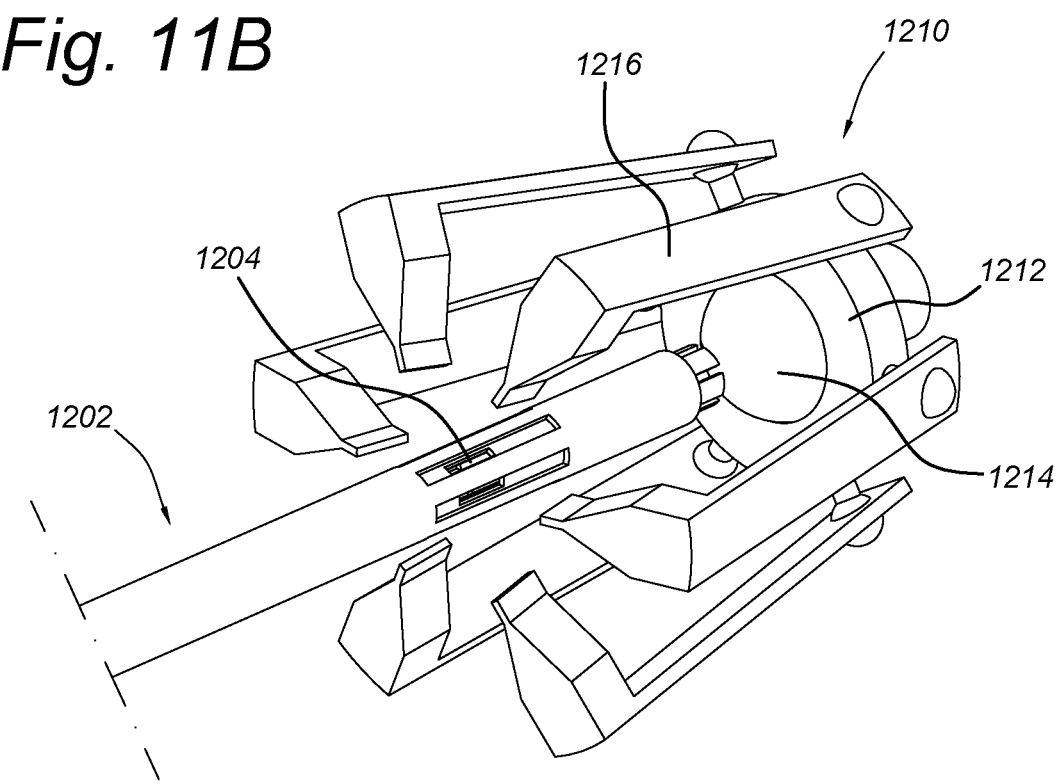
Figure 11C:
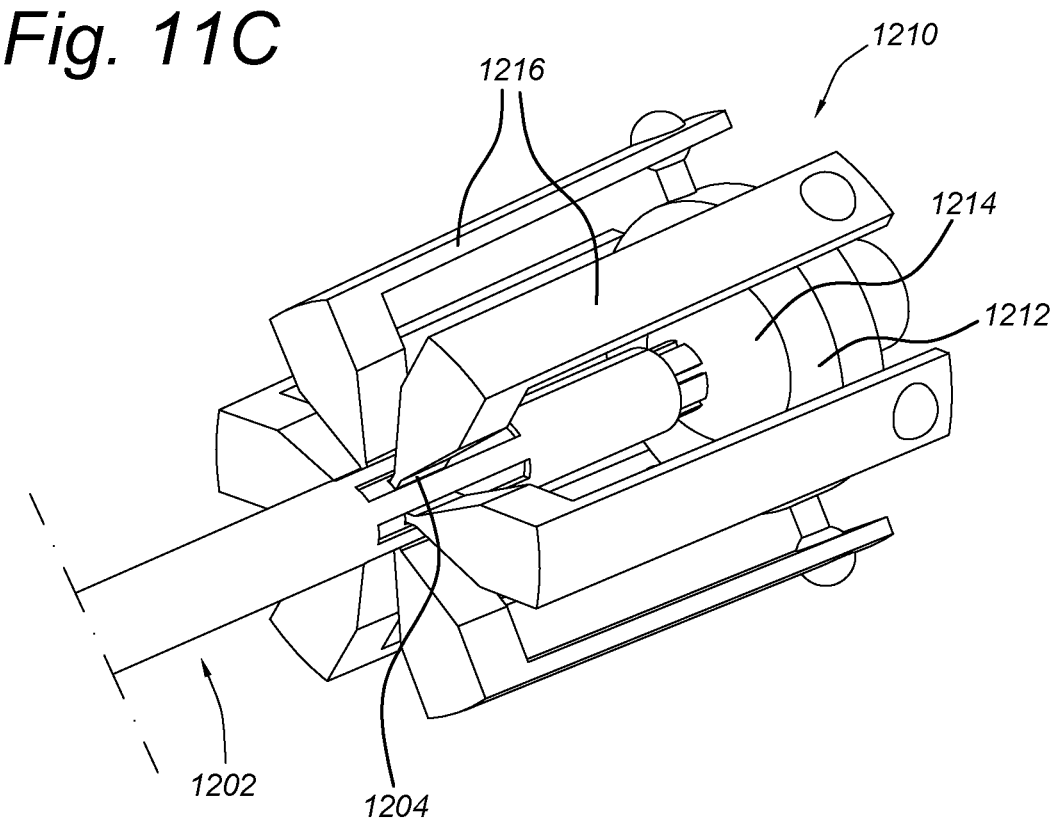

FIGS. 11A-11C shows an alternative structure for an instrument and a steering device according to another embodiment of the invention.

The instrument 1202 comprises an outer tube 1206 covering the longitudinal elements 1200. The outer tube 1206 comprises a plurality of openings 1208. The longitudinal elements 1200 of instrument 1202 also comprise a plurality of openings 1204 overlapping with the openings 1208 of the outer tube 1206. The openings 1208 of the outer tube and the openings 1204 of the longitudinal elements 1200 may result from laser cutting in the corresponding cylindrical tubes.

These openings 1204 and 1208 extend through the whole thickness of the material. As an alternative to laser cutting other techniques may be used, e.g., cutting by means of water jets. Also, other methods such as 3D laser printing may be used.

FIG. 11B shows the instrument 1202 and a steering device 1210 wherein the steering device 1210 and the instrument 1202 are detached. The steering device 1210 comprises a steering unit 1212 and a supporting unit 1214 wherein the steering unit 1212 is rotationally mounted on the supporting unit 1214 similar to the supporting unit 502 and the steering unit 504 of FIG. 5. The steering unit 1212 comprises a plurality of a plurality of arm-shaped elements 1216 fixedly connected to the steering unit 1212 and extending outwardly from the steering unit for connecting the plurality of longitudinal elements 1208 to the steering unit 1212.

FIG. 11C shows the instrument 1202 and the steering device 1210 of FIG. 11B connected together by inserting the end part of the arm-shaped elements 1216 into the openings 1204 of the longitudinal elements 1200 such that, by steering the steering unit 1212 around the supporting unit 1214, the arm-shaped elements 1216 pull from or push the longitudinal elements 1200 for controlling the distal end (not shown in FIGS. 12A-C) of the instrument 1202.

Figure 12:
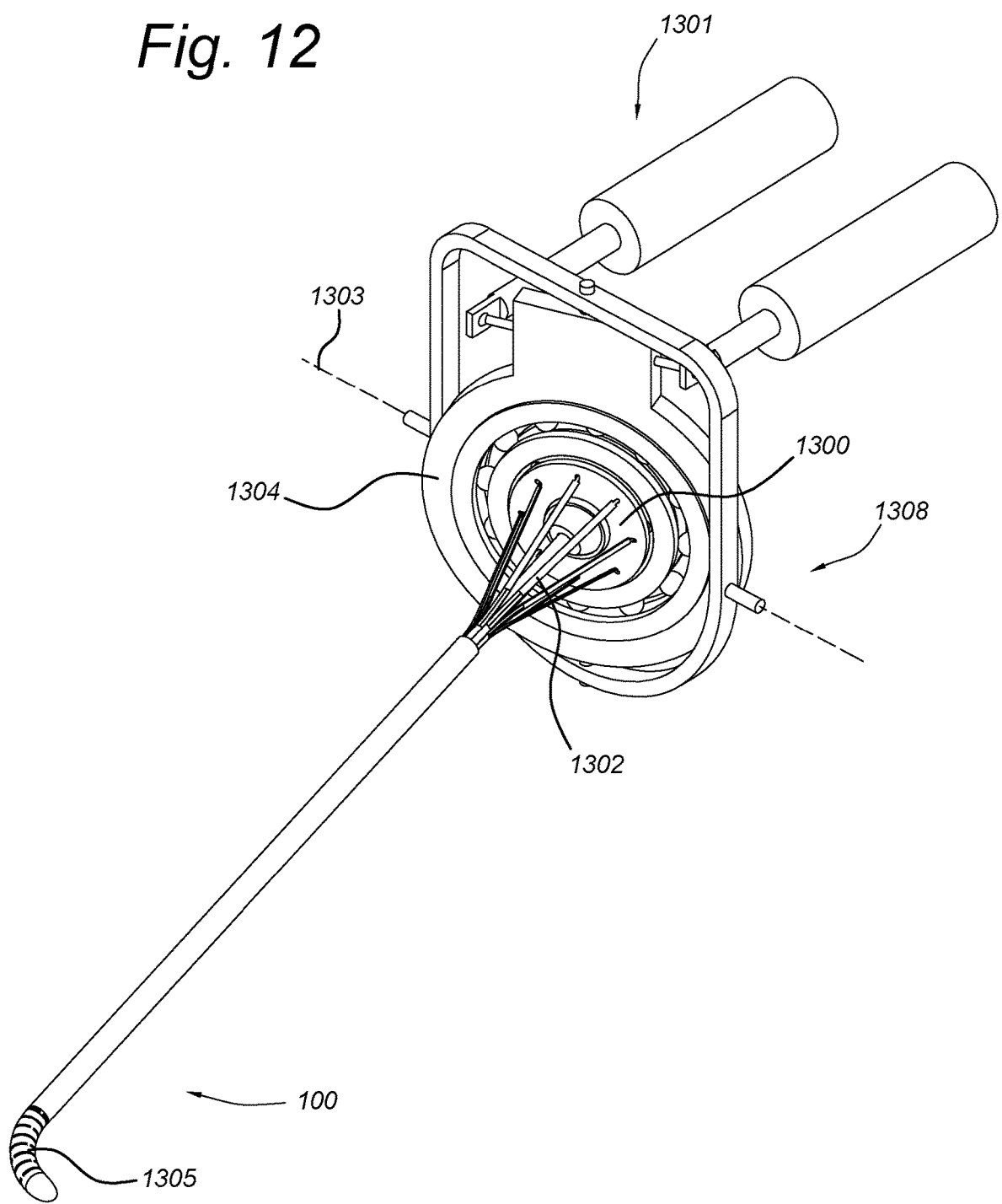
FIG. 12 shows the full instrument with steering device, connected and with a deflection of the distal end.

FIG. 12 shows an example of a deflection of steering plate 1300, causing a deflection in a distal end 1305 of instrument 100. Actuators 1301 are connected to inner frame 1304 around a hinge axis 1303. Other embodiments could include another frame with another hinge axis. To enable any movement of the steering plate 1300 in space. The steering unit could be controlled manually, or through robotics, or a combination of the two. Actuators 1301 move inner frame 1304 such that the distal end is deflected in a certain direction. This causes tension in some longitudinal elements and relaxation in others, thereby causing the deflection at the distal end. Some embodiments could include the longitudinal elements connected differently at the distal end (e.g., rotated 180 degrees) such that they cause opposite deflection of the distal end for the same movement depicted in steering unit 1308.

As can be seen in FIG. 12, in order to enable movement in any three dimensional plane as well as rotational movement of steering plate 1300, and therefore any bending or rotation of instrument 100, the suspension and control through steering device 1308 can be complicated. By using a steering plate 1300 to which longitudinal elements 1302 of instrument secure, and providing a quick but simple and secure coupling to a locking plate, steering device 1308 can be reused while allowing for a disposable instrument. This enables more complicated steering devices 1308, particularly useful in robotics applications.

The different steerable instruments described in the different embodiments can include a handle arranged at the proximal end if manually operated (see FIG. 12), or can include a robotic steering unit for steering the distal end of the instrument and/or for manipulating a tool, arranged at the distal end of the instrument. Such a tool can, for example, be a camera, a manual manipulator, e.g. a pair of scissors, manipulators using an energy source, e.g. an electrical, ultrasonic or optical energy source. The instrument has no limitation as to the type of tool applied at the distal end. The type of handle or robotic steering unit and/or connection will be selected depending on the type of tool applied at the distal end, the intended use and other instrument or operational requirements.

Also the steering units have been described as ball-shaped, though could be shaped differently in different embodiments. In some embodiments steering plate of the steering unit may be connected differently (e.g., directly to channel or locking plate) and/or not include a support member. Longitudinal elements may be connected to different portions of the steering unit and in a variety of different ways, typically circumferentially around the steering unit. Different instruments can include different numbers of longitudinal elements depending on the deflection capabilities desired.

Any number of deflection or bending zones can be included by using an appropriate number of longitudinal elements and connecting them at appropriate positions along the length of instrument. The distal end 1305 and the longitudinal elements may be made by laser cutting the same longitudinal tube. The distal end may have any number of bendable zones When the operation or procedure is completed, instrument 100 can be easily and quickly disconnected from steering device as it has been explained in relation to several embodiments.

Instrument 100 can then be discarded, with steering device available to use with a new, clean instrument 100 for further operations. In some embodiments, instrument 100 could be sent for cleaning and sanitization for preparing for reuse. In such embodiments, the ability to disconnect the part needing cleaning can help to ensure proper cleaning and sterilization can be done. For example, a disconnected instrument could be placed in a sanitization chamber, whereas an instrument which didn't disconnect may not be due to size and/or other sensitive parts.

As discussed in the background, past instruments that were reused needed to go through extensive cleaning and decontamination operations for safe reuse. This was a time consuming process that did not always eliminate all contaminants. Some steerable instruments were disposable to avoid the time, costs and risks of attempting cleaning, but disposing of a full instrument after every operation is quite costly. By using a steering device which can couple to and decouple from an instrument 100 in a quick, easy and secure manner, only the part of the instrument which experiences the contamination can be disposed of (or cleaned and sterilized in some situations), and other parts can be safely reused without the need for extensive decontamination processes. As steering portions of such instruments can be complicated and a relatively expensive part, being able to decouple the exposed portion of the instrument from the steering portion, and only disposing of the exposed portion is a great economic benefit and results in less waste. Using a quick and simple coupling between instrument and steering device allows for quick coupling and decoupling of a disposable instrument 100 to a reusable steering device at the location of use, and by non-trained or non-technical persons.

WO 2009/112060 A1, WO 2009/127236 A1, WO 2017/213491 A1, and WO 2018/067004 show embodiments in which this invention can be applied and are hereby incorporated by reference.

The instrument 100 may be manufactured such that the longitudinal elements 1302 are implemented by longitudinal strip shaped elements in a tube separated by longitudinal slots resulting from laser cutting in the cylindrical tube, and the bendable parts of the distal end may be implemented performing laser cuts in the same tube as explained in detail in, for example, WO 2009/112060 A1, WO 2009/127236 A1, WO 2017/213491 A1, and WO 2018/067004. As an alternative to laser cutting other techniques may be used, e.g., cutting by means of water jets. Also, other methods such as 3D laser printing may be used. These slots extend through the whole thickness of the material. This also holds for other embodiments discussed above.

The examples and embodiments described herein serve to illustrate rather than to limit the invention. Elements from different embodiments can be combined to form embodiments not shown in the Figures unless such combinations are non-compatible. The person skilled in the art will be able to design alternative embodiments without departing from the scope of the claims. Reference signs placed in parentheses in the claims shall not be interpreted to limit the scope of the claims. Items described as separate entities in the claims or the description may be implemented as a single item or multiple hardware items combining the features of the items described.

It is to be understood that the invention is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

The invention claimed is:

1. A steering device for connecting to an elongated instrument, the steering device comprising
   a supporting unit comprising a first-channel having a first central axis, the channel extending from a distal side to a proximal side of the supporting unit, wherein the supporting unit is arranged around the channel; and
   a steering unit rotationally arranged on the supporting unit, the steering unit arranged to secure/release a plurality of longitudinal elements of an instrument such that, when the steering unit is secured to the longitudinal elements, the longitudinal elements move with the rotational movement of the steering unit.

2. The steering device according to claim 1, wherein the supporting unit comprises a ball shaped element such that the steering unit can rotate around the ball shaped element and the channel extends through the ball shaped element.

3. The steering device according to claim 1, wherein the steering unit comprises a steering plate.

4. The steering device according to claim 1, wherein the channel is a first channel and the steering unit comprises a second channel and the ball shaped element is arranged in the second channel.

5. The steering device according to claim 1, wherein the steering unit comprises a plurality of connectors for connecting the plurality of longitudinal elements to the steering unit.

6. The steering device of claim 5, wherein the plurality of connectors comprise a plurality of openings in the steering unit, and each of the plurality of openings is configured to receive one longitudinal element.

7. The steering device of claim 5, wherein the plurality of connectors comprise a plurality of grooves extending inward from the circumference of the steering unit, and each of the plurality of grooves is configured to receive one longitudinal element.

8. The steering device of claim 5, wherein the plurality of connectors comprise a plurality of arm-shaped elements extending outwardly from the steering unit.

9. The steering device according to claim 1 further comprising a locking mechanism for securing the longitudinal elements to the steering unit.

10. The steering device of claim 9, wherein the locking mechanism comprises a locking plate configured to secure the plurality of longitudinal elements to the steering unit.

11. The steering device of claim 10, wherein the plurality of longitudinal elements are secured to the steering unit through a plurality of openings and the locking plate connects to the steering unit such that the locking plate prevents the plurality of longitudinal elements from exiting the plurality of openings.

12. The steering device of claim 11, wherein the locking plate is movable from an open position where the longitudinal elements can be inserted or removed from the openings to a locked position where the longitudinal elements are secured within the openings.

13. The steering device of claim 12, wherein the locking plate is moveable axially to secure longitudinal elements in openings extending inward from the circumference of the steering unit.

14. The steering device of claim 12, wherein the locking plate is rotationally moveable to move from the open position to the locked position.

15. The steering device of claim 14, wherein the locking plate comprises a plurality of protruding elements extending around the outer circumference of the locking plate, wherein each of the plurality of protruding elements comprises a hook-shaped side arranged to receive a longitudinal element in a channel to secure the longitudinal element.

16. The steering device of claim 15, wherein each of the plurality of protruding elements comprises an inclined side arranged opposite the channel such that when the locking plate rotates from the locked position with the longitudinal elements secured in the channels to the open position, the longitudinal elements slide on the inclined side of the protruding elements and are thereby pushed out from the plurality of openings.

17. The steering device of claim 1, wherein the steering device is arranged such that, when the plurality of elongated elements are secured to the steering unit, rotational movement of the steering unit around the supporting unit will cause the steering unit to push and/or pull the plurality of elongated elements.

18. The steering device of claim 1, and further comprising a guiding element for guiding the plurality of elongated elements into securing positions of the steering unit.

19. The steering device of claim 1, comprising an outer housing for the steering device.

20. An elongated instrument for connecting to a steering device, the instrument comprising:
   an elongated shaft with a distal end and a proximal end; and
   a plurality of elongated elements extending along the shaft, wherein each of the plurality of elongated elements comprises at the proximal end a connecting part for securing the elongated instrument to the steering device,
   wherein the elongated instrument comprises a tube and the plurality of longitudinal elements are made by either laser or water cutting a plurality of longitudinal slots in the tube.

21. The elongated instrument of claim 20, wherein the plurality of longitudinal elements are arranged extending outwardly from the elongated shaft.

22. The elongated instrument of claim 21 comprising a cone-shaped device at the proximal end arranged to push away the longitudinal elements for extending outwardly from the elongated shaft.

23. The elongated instrument of claim 20, wherein the connecting part comprises an opening.

* * * * *